US006189837B1

(12) United States Patent
Matthews

(10) Patent No.: US 6,189,837 B1
(45) Date of Patent: Feb. 20, 2001

(54) AUXILIARY SPOILER RETRACT SYSTEM

(75) Inventor: Francis Matthews, Bellevue, WA (US)

(73) Assignee: The Boeing Company, Seattle, WA (US)

( * ) Notice: Under 35 U.S.C. 154(b), the term of this patent shall be extended for 0 days.

(21) Appl. No.: 09/182,830

(22) Filed: Oct. 29, 1998

(51) Int. Cl.[7] .................................................... B64C 13/44
(52) U.S. Cl. ......................... 244/213; 244/75 R; 244/78
(58) Field of Search .................................. 246/213, 214, 246/215, 75 R, 78; 61/635, 636, 632, 634, 416

(56) References Cited

U.S. PATENT DOCUMENTS

| | | | |
|---|---|---|---|
| 2,327,210 | * 8/1943 | Overbeke et al. | 244/78 |
| 4,052,024 | * 10/1977 | Smith | 244/78 |
| 4,052,851 | * 10/1977 | Brown | 60/416 |
| 4,308,721 | * 1/1982 | Thomas et al. | 60/632 |

* cited by examiner

Primary Examiner—Galen L. Barefoot

(74) Attorney, Agent, or Firm—Christensen O'Connor Johnson Kindness PLLC

(57) ABSTRACT

An improvement is presented for use in aircraft that have a battery (26), a hydraulically-operated aircraft component (such as a spoiler), and a hydraulic system having a return line (R). The improvement includes a hydraulic transfer cylinder assembly (20) for moving a particular aircraft component (32) in a desired direction during an emergency situation. A preferred assembly (50) includes a housing (52) having a cartridge (62) that is mounted directly to the housing base. The housing includes a first compartment (54), a second compartment (56) fillable with a hydraulic fluid, and a piston (58) separating the first and second compartments. The second compartment has an output port (53) that is in hydraulic communication with the particular aircraft component. The cartridge (62) includes a main firing element. Activation of the cartridge causes the main firing element to produce expanding gas that enters the first compartment (54) and forces the piston to translate, thus forcing hydraulic fluid out the output port (53). Means are provided for ensuring that the pressurized hydraulic fluid of the transfer cylinder assembly enters the hydraulically-operated component at a location that will force the component to move in the desired direction.

32 Claims, 4 Drawing Sheets

AUXILIARY SPOILER RETRACT SYSTEM

FIELD OF THE INVENTION

The present invention relates to hydraulic systems that utilize pyrotechnic power, and more particularly, to hydraulic systems for which pyrotechnic-powered devices provide pressurization to retract spoilers during an emergency situation.

BACKGROUND OF THE INVENTION

For commercial aircraft, it is important in emergency situations to be able to quickly and effectively evacuate all passengers. In support of this, various aircraft components must be operable, even if the aircraft loses its ability to provide electrical and/or hydraulic power.

One example of where this is crucial is in the retraction of wing spoilers. During an emergency, overwing exit doors may be opened to provide passengers with an alternative escape route. It is typical for the opening of these doors to trigger automatic deployment of self-inflating overwing escape slides. Because these slides are puncturable, it is important to quickly retract any extended wing surfaces that may interfere with or damage the slides, or that may interfere with passenger egress. Should the aircraft lose its hydraulic and/or electrical systems, some type of backup system must be available to retract these surfaces.

FIG. 1 illustrates a known aircraft having an actuator 10 that is activated by a pyrotechnic device 12. The opening of an overwing escape door triggers a battery to send a current to the pyrotechnic device and to an electrical relay that removes power from a hydraulic servo valve that is mechanically biased to the retract position with power off. The device, in turn, causes an actuator piston 14 to mechanically rotate a spoiler panel 16 to its stowed position. This system works satisfactorily, but has a number of implementation disadvantages. One disadvantage is that the actuator must be connected to wing structure that is capable of withstanding the actuator's reaction loads when fired. This requires an increase in the thickness of the wing loading members, which adds undesirable weight to the wing. A second disadvantage is that the spoiler surface must be designed to include a moment arm for the actuator to react against. This adds weight to the spoiler surface and makes the configuration no longer compatible with other variations of that particular airplane model. A third disadvantage is that the actuator must be mounted in a specific location to push against the spoiler surface.

A fourth disadvantage is that the actuator is not connected to the main hydraulic system. Therefore, the actuator must be checked periodically for leaks, and if leaks have occurred, they must be repaired and the actuator manually refilled with hydraulic fluid. In addition, once the actuator is fired, it must be manually repositioned to its initial state. Should an anomalous firing occur in flight, the actuator would apply a load to the spoiler surface until the gas pressure is manually released, on the ground.

U.S. Pat. No. 5,582,010 describes a pyrotechnically operated pressurization device attached directly to a hydraulic tank. The device is activated by an electronic igniting unit that heats a combustion chamber filled with a propellant charge. The expanding propellant charge activates a cartridge base to eventually force excess hydraulic fluid into the tank. Upon activating the device, the entire hydraulic tank and its corresponding circuits are pressurized. A disadvantage of this device is the possibility that the pressurization may be insufficient for the entire hydraulic system, plus any leaks or pressure outlets resulting from the emergency situation may thwart the pressurization provided by the pyrotechnic device.

Thus, a need exists for an auxiliary hydraulic power system capable of providing emergency hydraulic fluid pressurization to select aircraft components. Example components that would benefit from such a device are wing spoilers. An ideal auxiliary spoiler retract system would be capable of quickly retracting extended spoilers upon the opening of overwing exit doors and/or deployment of overwing emergency escape slides. The ideal auxiliary spoiler retract system would be pyrotechnically activated, would include components that do not require significant maintenance, and would have minimal impact on the aircraft's main hydraulic system. Activation of the system would provide immediate hydraulic pressure to the spoilers without necessarily having to provide pressure to the entire hydraulic system. Further, the ideal auxiliary hydraulic power system would be available regardless of the availability of the aircraft's main electrical and/or hydraulic systems. The present invention is directed to fulfilling these needs.

SUMMARY OF THE INVENTION

In accordance with aspects of the present invention, an improvement to an aircraft is provided for moving a particular hydraulically-operated aircraft component in a desired direction during an emergency situation. The improvement includes a transfer cylinder assembly for producing a discrete amount of pressurized hydraulic fluid. Means are provided for ensuring that the fluid enters the component at a location appropriate to force the component to move in the desired direction.

The transfer cylinder assembly includes a housing having a first compartment, a second compartment fillable with a hydraulic fluid, and a piston separating the first and second compartments. The second compartment includes an output port in hydraulic communication with the particular aircraft component. A cartridge is mounted on one end of the housing near the first compartment. The cartridge includes a main firing element. Activation of the cartridge causes the main firing element to produce expanding gas that enters the first compartment and forces the piston to translate, thus forcing hydraulic fluid out the output port.

The housing preferably includes a refill port adapted to connect to the aircraft's main hydraulic system return line. In one embodiment, an isolation check valve is in communication with the transfer cylinder assembly to allow hydraulic fluid to exit the second compartment through the output port while prohibiting the reverse flow. The transfer cylinder assembly cartridge is preferably activated by an electric current sent from a battery, so that the assembly need not rely on electrical power from the aircraft's main electrical system.

In accordance with other aspects of this invention, one embodiment of the improvement is described as applied to the retraction of a hydraulic spoiler. In this embodiment, a spoiler actuator having an extend and a retract side is connected to the return and pressure lines of the aircraft's main hydraulic system. The transfer cylinder assembly output port is in hydraulic communication with the retract side of the actuator. The second compartment includes a refill port adapted to connect to a hydraulic system return line. A check valve is located at the refill port for allowing entry of hydraulic fluid into the second compartment while prohibiting the reverse flow.

In accordance with still other aspects of this invention, a preferred transfer cylinder assembly is provided having a housing and a cartridge attached to the housing. The housing includes a first compartment, a second compartment fillable with a hydraulic fluid, and a piston separating the first and second compartments. The second compartment has an output port. The cartridge includes a main firing element. Activation of the cartridge causes the main firing element to produce expanding gas that enters the first compartment and directly forces the piston to translate, thus forcing hydraulic fluid out the output port.

In one embodiment, the cartridge includes an ignition device and a time delay component in addition to its main firing element. An example cartridge that may be used is the P/N S251W172 manufactured by OEA Aerospace, Inc. In one embodiment, the time delay component causes a delay of an amount in the range of about 0.26 to about 0.36 seconds. In another embodiment, the transfer cylinder assembly provides hydraulic fluid at a pressure in an amount in the range of about 0 psi to about 1450 psi. In yet another embodiment, the housing and the piston are both cylindrically shaped, the piston being positioned entirely within the housing and arranged to prohibit contact of expanding gas with the second compartment during firing of the cartridge.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

In general, an auxiliary hydraulic power system formed in accordance with the present invention includes a unique pyrotechnic-powered device in one-way hydraulic communication with a particular hydraulically-operated aircraft component. The preferred pyrotechnic-powered device is powered directly by the energy created during activation of a cartridge, whereupon pressurized hydraulic fluid is available to hydraulically move the aircraft component in the desired direction.

Figure 1:
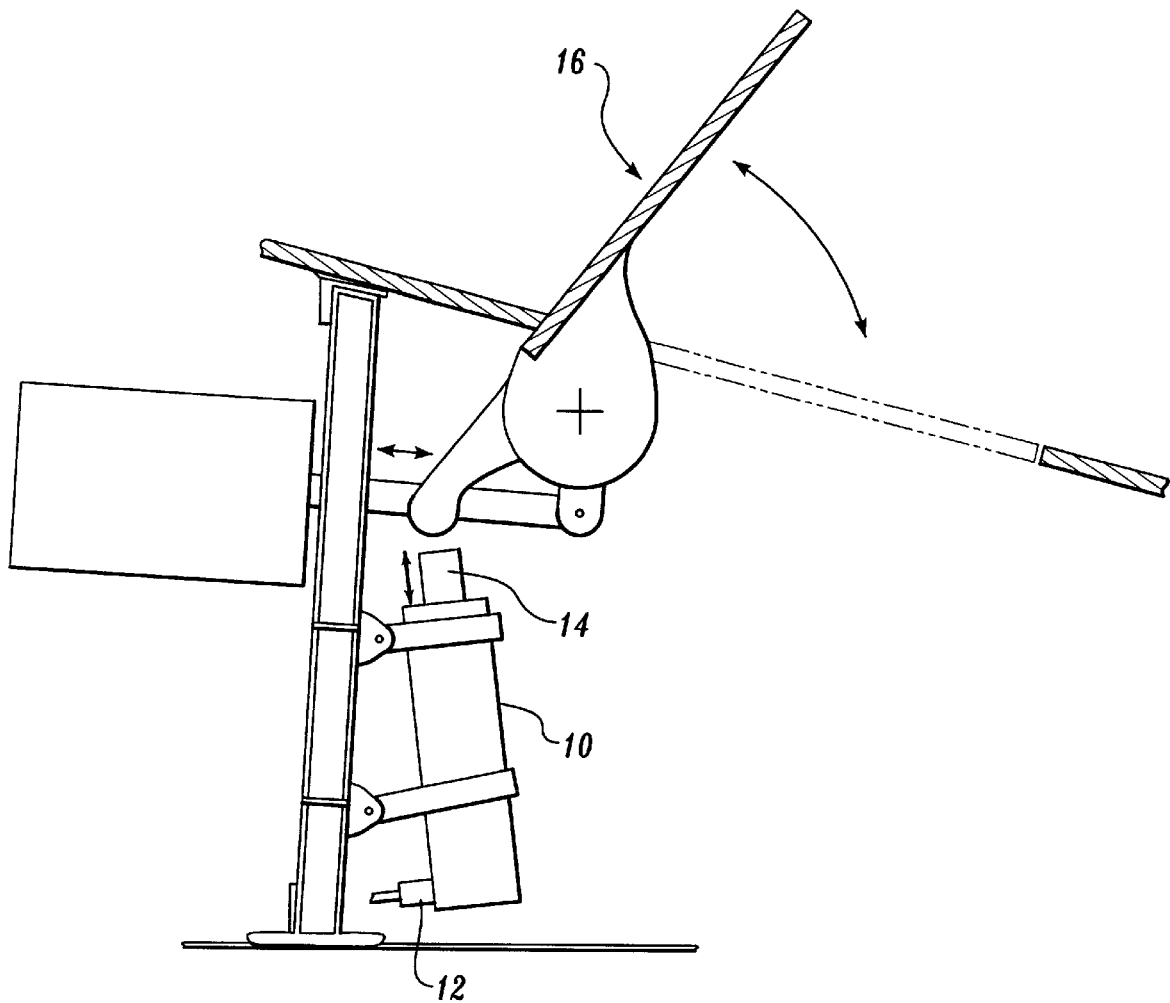
FIG. 1 is a side view of a known aircraft spoiler retraction arrangement including a pyrotechnically activated actuator.
Figure 2:
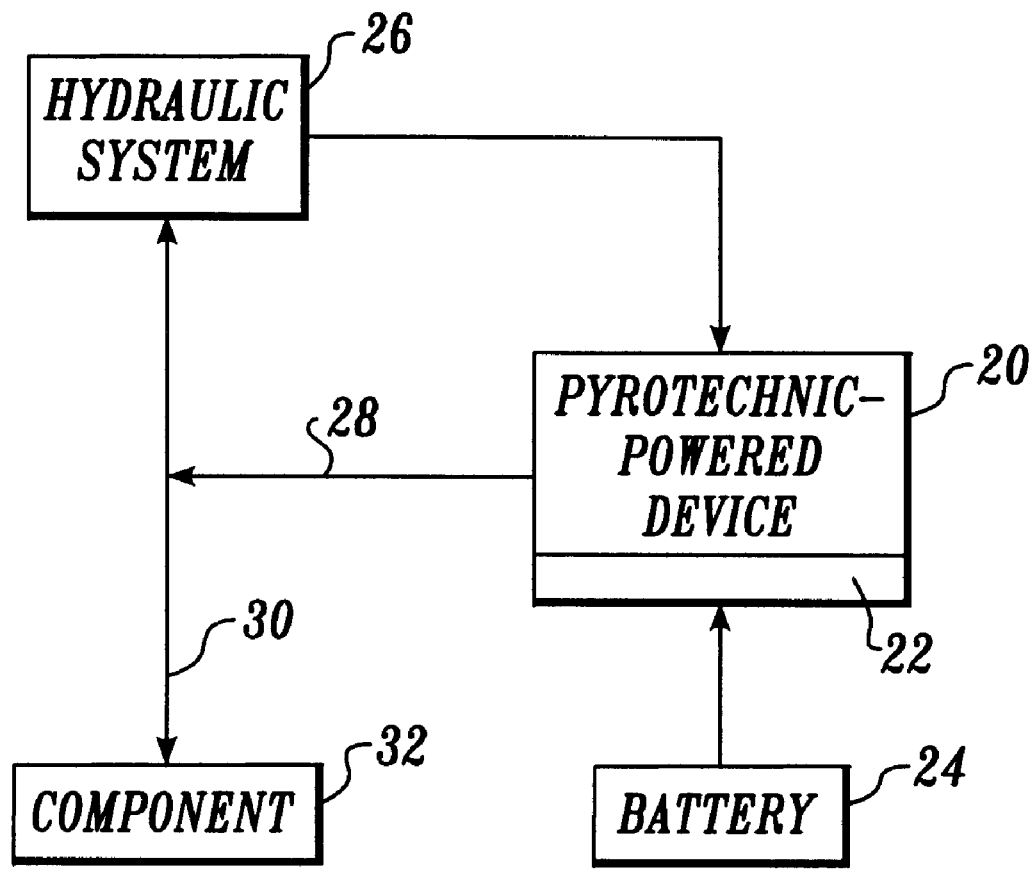
FIG. 2 is a system schematic illustrating an auxiliary hydraulic power system formed in accordance with the present invention.

Referring to FIG. 2, an auxiliary hydraulic power system formed in accordance with the present invention includes a hydraulic transfer cylinder assembly 20 having a cartridge 22 that is electrically triggered by a battery 24. The transfer cylinder assembly 20 includes an amount of hydraulic fluid easily replenishable from the aircraft's main hydraulic system 26. Upon activation of the cartridge, the cartridge directly forces a piston to move or direct hydraulic fluid through a transfer hose 28 to a component input line 30, the component input line 30 being the normal hydraulic input line for a particular component 32 for moving the component in the desired direction. Receipt of the pressurized hydraulic fluid from the transfer cylinder assembly thereby forces movement of the component 32. The location of the component input line 30 will depend on the particular hydraulic and component configuration to which the present invention is being applied. In some instances, the line may be located within a pre-existing component. If this is the case, the pre-existing component will need to be modified accordingly.

Figure 3:
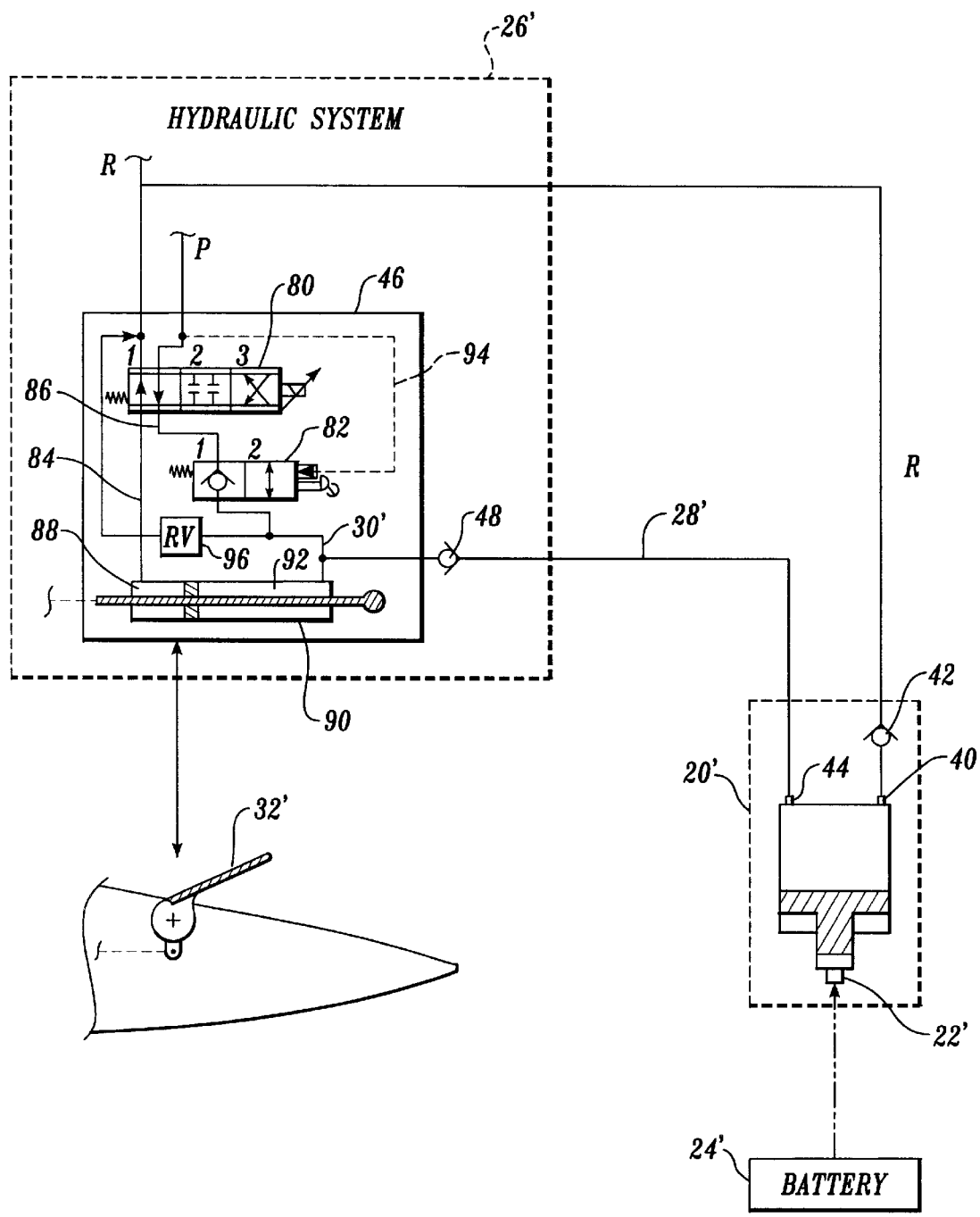
FIG. 3 is a system schematic illustrating an auxiliary spoiler retract system as exemplary of one embodiment of an auxiliary hydraulic power system formed in accordance with the present invention.

By way of example, FIG. 3 illustrates one example of an auxiliary hydraulic power system as applied to retract a wing spoiler. The arrangement includes a hydraulic transfer cylinder assembly 20' having a fill port 40 connected to the return line R of an aircraft's main hydraulic system 26'. Typical aircraft return lines R are pressurized in an amount sufficient to fill the assembly 20' and return the transfer cylinder piston to the retracted or firing position. A check valve 42 is installed at the fill port 40 to allow only one-way travel into the transfer cylinder assembly, thus, preventing the assembly from forcing pressurized hydraulic fluid back through the return line R during firing of the transfer cylinder assembly. A pyrotechnic cartridge 22' with a built-in time delay pressurizes the assembly. A preferred transfer cylinder assembly is described below with reference to FIG. 4.

Still referring to FIG. 3, the transfer cylinder assembly also includes an output port 44 connected to a transfer hose 28'. In the particular embodiment shown in FIG. 3, the main hydraulic system includes a power control unit 46 for extending and retracting each spoiler. The transfer hose 28' connects to the power control unit as described in further detail below. A second check valve 48 is provided along the transfer line to allow one-way travel of hydraulic pressure into the power control unit, and not the reverse. The check valve also prevents the transfer cylinder from being subjected to normal pressure fluctuations in the power control unit and it ensures that the spoiler surface remains retracted, until a definite action is taken to release the trapped pressure. The second check valve 48 is shown in FIG. 3 as being located in the power control unit. Equally as viable, the second check valve may be located within the transfer cylinder.

A battery 24' electrically activates the transfer cylinder assembly. The battery, in turn, is triggered by the opening of an overwing exit door. A control unit electronically orchestrates initiation and timing of the various components.

Figure 4:
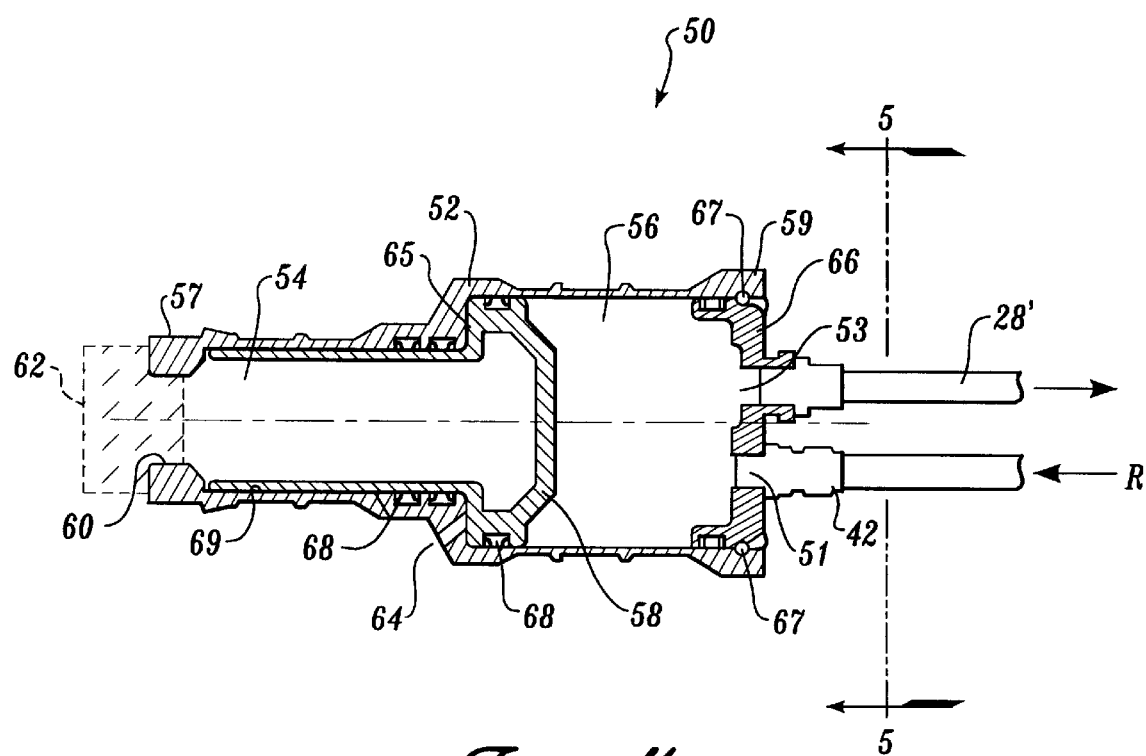
FIG. 4 is a cross-sectional side view of an embodiment of a pyrotechnically-powered hydraulic transfer cylinder assembly formed in accordance with the present invention.
Figure 5:
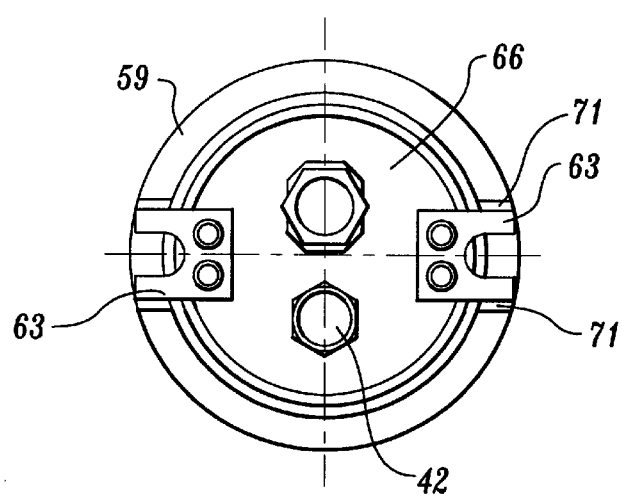
FIG. 5 is an end view of the assembly of FIG. 4.

FIG. 4 illustrates a preferred transfer cylinder assembly 50. The assembly 50 includes a housing 52, an internal piston assembly 58, a cartridge assembly 62, and an end cap 66. The housing 52 has first and second end 57, 59. Both ends are sealed off to atmosphere, by a seal located on the cartridge at the first end 57 and another seal located on the end cap 66 at the second end 59. The cartridge assembly 62 is installed and bolted in position in the housing first end 57. The end cap 66 is installed in the housing second end 59 using shear rings 67 to react out the load generated in the second end of the housing. As shown in FIG. 5, a pair of clamps 63 are located between lugs 71 formed in the exterior surface of housing 52. The clamps are attached to the end cap 66 and are provided to maintain the end cap 66 in its installed location relative to the housing 52. Piston seals 68 are used to provide sealing between the piston and the housing. One type of seal that the inventor herein has found to work well is an AGT ring seal, supplied by Greene, Tweed & Co.

A first compartment 54 is located near the first end. The first compartment is originally empty, but is capable of being filled with hot expanding gases. A second compartment 56 is located near the second end. The second compartment 56 is originally filled with hydraulic fluid. A fill port 51 and output port 53 are both provided in the end cap 66. Both ports 51, 53 are in communication with the fluid compartment 56. The fill port 51 is connected to the return line R to allow the main hydraulic system return to force hydraulic fluid into the transfer cylinder as needed. Therefore, minor fluid leaks in the second compartment of the housing are automatically compensated. Also, the return line pressure pushes the transfer cylinder piston to the retracted or firing position.

In the embodiment shown in FIG. 4, the check valve 42 is located at the fill port 51. This check valve allows fluid to enter the second compartment via the fill port 51 but prevents it from exiting. A second check valve (not shown in FIG. 4, but shown as 48 in FIG. 3) is also provided, though located in the transfer hose 28' at its connection with the component input line 30'. The second check valve prevents the transfer cylinder assembly from being pressure cycled by normal hydraulic system pressure and ensures that the spoiler surface remains retracted, until a definite action is taken to release the trapped pressure.

The cartridge 62 includes an ignition device, a time delay component and a main firing element. The time delay component provides enough time delay such that any necessary main hydraulic component movement may be accomplished prior to the input of pressurized hydraulic fluid from the transfer cylinder assembly. One type of cartridge that the inventor herein has found to work well is the P/N S251W172 manufactured by OEA Aerospace, Inc.

The first compartment components are designed to allow for the maximum gas pressure generated by the cartridge when the piston 58 is locked in the retracted position. In a preferred embodiment there should also be sufficient clearance 69 between the piston 58 and the housing 52, outside of the seal area, to allow for effective, in situ cleaning and removal of the products of combustion from the housing and piston surfaces, without removing the piston. In this regard, the cartridge mounting port 60 is maximized in size to allow for access to the first compartment for cleaning. The end cap 66 to housing 52 attachment is designed to withstand the force of a piston hitting the end cap, should the cartridge be fired without fluid in the second compartment. In preferred embodiments, the transfer cylinder is installed in an upright position, with the first compartment at the lower elevation. This will facilitate cleaning of the first compartment after a cartridge firing, and will minimize air entrapment in the second compartment. An interseal drain/breather passageway 64 allows the volume 65 between the piston and the cylinder housing to breath as the piston extends and retracts. The interseal drain/breather passageway 64 is also used to monitor for leaks past the seals 68. It is further useful to include an indicator within the cartridge or housing to show if the cartridge has been fired and means for bleeding off gas pressure prior to the removal of a fired cartridge from the housing.

During firing, expanding gases are produced by the cartridge. These gases move into the first compartment and rapidly force the piston 58 toward the housing second end 59. This movement, in turn, pressurizes the hydraulic fluid in the second compartment 56 and forces the fluid out the output port 53. The entire assembly should be sized to produce the required amount of pressurized hydraulic fluid necessary to move the particular aircraft component.

Referring back to the auxiliary spoiler retract arrangement of FIG. 3, the power control unit includes a three-position electro-hydraulic servovalve 80 that is mechanically biased to position 1, as shown. Also provided is a two-position extension check valve 82 that is shown and mechanically biased to its position 1. Inputs to the servovalve 80 include the hydraulic return and pressure lines R, P. There are two outputs 84, 86 of the servovalve 80. One output 84 is connected directly to the extend side 88 of an actuator 90. The other output 86 is connected to the extension check valve 82. The output of the extension check valve is connected to the retract side 92 of the actuator, via component input line 30'. The transfer hose 28' connects to the component input line 30' through check valve 48. Lastly, a secondary pressurization path 94 is provided between the pressure line P and the extension check valve 82.

Servovalve positions 1 and 3 allow hydraulic fluid pressure to pass through the servovalve 80. Servovalve position 2 is a transient position where the ports are blocked off at both the input and output sides, thus prohibiting passage of fluid in either direction. Extension check valve position 1 allows one-way passage of hydraulic fluid pressure from the servovalve 80 to the component input line 30'. Extension check valve position 2 allows fluid passage in either direction through the check valve 82. When system pressure P is available, fluid enters the secondary path 94 and moves the extension check valve to its position 2. A relief valve 96 is preferably interconnected between the component input line 30' and the return line R to accommodate hydraulic fluid thermal overpressure.

In general, the actuator 90 determines the position of the spoiler. The position of the actuator 90 is determined by the connection of the actuator extend and retract sides 88, 92 with the return and pressure lines R, P, based on the positions of the servovalve 80 and the extension check valve 82.

Under normal operating conditions with both electrical and hydraulic power available, with the servovalve in its position 1, and with the extension check valve in its position 2, the spoiler is in a retracted state. In this state, hydraulic fluid pressure is provided from the pressure line P to the retract side 88 of the actuator 90. Should the pilot want to extend the spoiler, he or she electrically initiates repositioning of the servovalve 80 to its position 3. Once at its position 3, the servovalve connects the pressure line P to the extend side 92 of the actuator and the retract side 88 of the actuator to the return line R. This arrangement allows the pressure line to fill the extend side of the actuator with hydraulics, forcing fluid to exit the actuator return side, and consequently forcing the extension of the spoiler. The spoiler is retracted in a similar, though reverse, manner.

Should the transfer cylinder assembly fire inadvertently in flight, there is no effect on the normal spoiler operation. The hydraulic pressure generated by the transfer cylinder will dissipate at the next spoiler operation, though the gas compartment of the transfer cylinder will need to be cleaned and a new cartridge installed to restore the transfer cylinder assembly function on the ground.

During an emergency situation in which hydraulic and electric power is available, the overwing doors are in a closed and armed state. Opening an overwing exit door causes the electronics controlling the electro-hydraulic servovalve 80 to shut off. This causes the servovalve 80 to revert to its biased position 1 in which normal hydraulic system pressure P will quickly retract the spoiler. Due to the limited amount of time available for retracting the spoilers, it is preferable that any opening of the overwing exit doors, however, also cause activation of the transfer cylinder assembly. This eliminates a need for additional components and time within which to determine whether the hydraulic system is operative.

Therefore, in preferred embodiments, during an emergency situation in which hydraulic and electric power is available, opening an overwing exit door will also simultaneously cause a current from the battery 24' to travel to the cartridge 22'. The time delay of the cartridge allows sufficient time for the servovalve 80 to reach its position 1. The firing of the cartridge main firing element then causes pressurized hydraulic fluid in the second compartment to enter the component input line 30', if the system pressure is less than the pressure generated by the cartridge.

During an emergency situation in which hydraulic power is available, but electric power is not, the electronics controlling the servovalve 80 will be shut off and the servovalve will automatically move to its bias position 1. The hydraulic pressure line will cause the actuator and thus the spoiler to retract. If an overwing door is opened, the cartridge will fire as well, further ensuring that the spoilers are retracted regardless of the availability of electrical power. The hydraulic pressure provided to the power control unit by the transfer cylinder will dissipate at the next spoiler operation and there will be no effect on normal spoiler performance.

During an emergency situation in which hydraulic power is unavailable, the pressure and return lines P, R have only negligible amounts of hydraulic fluid pressure. In such an instance, both the servovalve and the extension check valve move to their respective biased positions 1. The servovalve connects the extend side of the actuator with the return line R, and the retract side of the actuator with a check valve. Should the overwing exit door be opened, the battery 24' is triggered to electrically initiate the transfer cylinder cartridge 22' which results in pressurized hydraulic fluid being sent to the retract side of the actuator through the transfer hose 28' and the component input line 30'.

In one aircraft embodiment, the aircraft's main hydraulic pressure is provided in an amount in the range of about 0 to about 3,000 psi. The hydraulic fluid pressure provided by the transfer cylinder assembly is of an amount in the range of about 0 psi to about 1,400 psi. The cartridge includes a time delay component with a delay in the range of approximately 0.26 seconds to approximately 0.36 seconds. These values will vary greatly depending on the particular configuration and components selected.

As will be appreciated from the above, an auxiliary hydraulic power system formed in accordance with the present invention provides hydraulic power during an emergency situation. The system can be modified to accommodate a wide variety of existing hydraulic components, without only minor changes to the hydraulic system supporting that component. Thus, the auxiliary hydraulic power system eliminates the need for a separate, more complex emergency hydraulic power source. In addition, the cartridge pyrotechnic gas forces may be made to balance the hydraulic forces in the transfer cylinder. Therefore, a separate load reaction structure is not required to react the transfer cylinder assembly hydraulic forces. The auxiliary spoiler retract system has no effect on the normal component operation (i.e., whether the transfer cylinder assembly is fired or not fired). The assembly is also conveniently self-filling. Existing surfaces do not need to be modified to provide a moment arm for an external force to react against. The installation of the transfer cylinder is not required to be in a specific location.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In an aircraft including a battery, a hydraulically-operated aircraft component, and a hydraulic system having a return line, an improvement for moving a particular aircraft component in a desired direction during an emergency situation, the improvement comprising:
   (a) a hydraulic transfer cylinder assembly comprising:
      (i) a housing having a first compartment, a second compartment fillable with a hydraulic fluid, and a piston separating the first and second compartments, the second compartment including an output port in hydraulic communication with the particular aircraft component;
      (ii) a cartridge including a main firing element, the cartridge being located at one end of the housing and an end cap being located at the other end of the housing, the piston being located therebetween, the output port being located in the end cap; wherein activation of the cartridge causes the main firing element to produce expanding gas that enters the first compartment and forces the piston to translate, thus forcing hydraulic fluid out the output port; wherein clamps, bolted to the end cap and assembled to locate between lugs in the transfer cylinder housing, maintain the installed location of the output port in the end cap relative to the housing during activation; and
   (b) means for ensuring the pressurized hydraulic fluid of the transfer cylinder assembly enters the hydraulically-operated component at a location appropriate to force the component to move in the desired direction.

2. In a hydraulic spoiler actuation system including a battery, a spoiler actuator having an extend and a retract side, and a hydraulic system having a return line, an improvement for moving a particular aircraft component in a desired direction during an emergency situation, the improvement comprising:

a hydraulic transfer cylinder assembly comprising:
      (a) a housing having a first compartment, a second compartment fillable with a hydraulic fluid, and a piston separating the first and second compartments; the second compartment including an output port in hydraulic communication with the retract side of the actuator, the second compartment further including a fill port adapted to connect to the hydraulic system return line;
      (b) a check valve located at the fill port for allowing entry of hydraulic fluid into the second compartment while prohibiting the reverse flow; and
      (c) a cartridge including a main firing element; the cartridge being located at one end of the housing and an end cap being located at the other end of the housing, the piston being located therebetween, the output and fill ports being located in the end cap; wherein activation of the cartridge causes the main firing element to produce expanding gas that enters the first compartment and forces the piston to translate, thus forcing hydraulic fluid out the output port and into the retract side of the spoiler actuator; wherein clamps, bolted to the end cap and assembled to locate between lugs in the transfer cylinder housing, maintain the installed location of the ports in the end cap relative to the housing during activation.

3. A hydraulic transfer cylinder assembly for use in actuating hydraulic aircraft components during emergency situations, comprising:

(a) a housing having a first compartment, a second compartment fillable with a hydraulic fluid, and a piston separating the first and second compartments; the housing including an end cap with an output port; wherein clamps, bolted to the end cap and assembled to locate between lugs in the transfer cylinder housing, maintain the installed location of the output port in the end cap relative to the housing; and (b) a cartridge including a main firing element; wherein activation of the cartridge causes the main firing element to produce expanding gas that enters the first compartment and directly forces the piston to translate, thus forcing hydraulic fluid out the output port.

4. The hydraulic transfer cylinder assembly according to claim 3, wherein the piston seals are AGT ring seals.

5. In an aircraft including a battery, an aircraft component operated via a hydraulic actuator having first and second compartments, and a hydraulic system having a return line and a system pressure line, an improvement for moving the actuator in a desired direction during an emergency situation, the desired direction corresponding to one in which hydraulic fluid pressure fills the actuator second compartment, the improvement comprising:

(a) a power control unit including an electro-hydraulic servo valve and an extension check valve, the servo valve being connected to both the return line and the pressure line and further being connected to the actuator first compartment, the extension check valve being connected to the servo valve and the actuator second compartment via a component input line;

the servo valve having a first position and a second position; in the first position, the servo valve passes hydraulic fluid pressure to the actuator second compartment via the extension check valve and returns pressure from the first compartment; in the second position, the servo valve passes hydraulic fluid pressure to the actuator first compartment and returns pressure from the actuator second compartment via the extension check valve; the servo valve being biased to its first position;

the extension check valve having at least a first position and a second position, the first position disallowing hydraulic communication from the actuator second compartment to the servo valve, the second position allowing hydraulic communication between the actuator second compartment and the servo valve; when system hydraulic pressure is available, the extension check valve assumes its second position; when system hydraulic pressure is unavailable, the extension check valve assumes its first position;

(b) a hydraulic transfer cylinder assembly including a housing and a cartridge; the housing having a first compartment, a second compartment fillable with hydraulic fluid, and a piston separating the first and second compartments; the second compartment including an output port hydraulically connected to the component input line; the cartridge having a main firing element capable of producing expanding gas to enter the cartridge first compartment and force the piston to translate, thus forcing hydraulic fluid out the output port and into the actuator second compartment via the component input line;

wherein during an emergency, the servo valve is moved to its first position and the cartridge is activated; if system hydraulic pressure is available, the extension check valve assumes its second position and the hydraulic pressure from the hydraulic transfer cylinder assembly adds to the system pressure being applied to the actuator second compartment; if system hydraulic pressure is unavailable, the extension check valve assumes its first position and hydraulic pressure from the hydraulic transfer cylinder assembly alone is applied to the actuator second compartment.

6. The improvement according to claim 5, wherein the housing second compartment further includes a fill port adapted to connect to the hydraulic system return line, a check valve being located at the fill port for allowing entry of hydraulic fluid into the housing second compartment while prohibiting the reverse flow.

7. The improvement according to claim 5, wherein an isolation check valve is in communication with the transfer cylinder assembly to allow hydraulic fluid to exit the second compartment through the output port while prohibiting the reverse flow.

8. The improvement according to claim 5, wherein the cartridge further includes an ignition device and a time delay component.

9. The improvement according to claim 8, wherein the time delay component causes a delay in triggering the cartridge of an amount in the range of about 0.26 to about 0.36 seconds.

10. The improvement according to claim 5, wherein the aircraft includes an overwing exit door; and wherein the cartridge is activated by an electrical current sent from the battery, the battery being triggered by the opening of the overwing exit door.

11. The improvement according to claim 5, wherein the housing and piston are cylindrically shaped, the piston being positioned entirely within the housing, the piston being arranged to prohibit contact of expanding gas with the second compartment during firing of the cartridge.

12. The improvement according to claim 11, wherein the cartridge is located at one end of the housing and an end cap is located at the other end of the housing, the piston being located therebetween.

13. The improvement according to claim 12, wherein the end cap is installed with shear rings, to react the load generated during translation of the piston in the housing upon activation of the assembly.

14. The improvement according to claim 12, wherein clamps, bolted to the end cap and assembled to locate between lugs in the transfer cylinder housing, maintain the installed location of the hydraulic ports in the end cap relative to the housing.

15. The improvement according to claim 5, wherein the hydraulic transfer cylinder assembly provides hydraulic fluid at a pressure in an amount in the range of about 0 psi to about 1,400 psi.

16. The improvement according to claim 5, wherein the servo valve is mechanically biased to its first position and electronically moved between positions.

17. The improvement according to claim 5, wherein the extension check valve is mechanically biased to its first position and hydraulically moved between positions via pressure from the system pressure line.

18. The improvement according to claim 5, wherein the extension check valve first position permits hydraulic fluid pressure from the system pressure to enter the actuator second compartment.

19. The improvement according to claim 5, further comprising a relief valve interconnected between the component input line and the return line.

20. In a hydraulic spoiler actuation system including a spoiler, a battery, a spoiler actuator having an extend side and a retract side, and a hydraulic system having a return line and a system pressure line, an improvement for moving the spoiler to a retract position during opening of an overwing door, the improvement comprising:

(a) a power control unit including an electro-hydraulic servo valve and an extension check valve, the servo valve being connected to both the return and pressure lines to relieve and provide, respectively, hydraulic pressure to the spoiler actuator, as needed; the servo valve being biased to provide hydraulic pressure to the actuator retract side; the extension check valve being located between the connection of the servo valve and the actuator retract side and being biased to a position in which hydraulic fluid is not permitted to flow from the actuator retract side to the servo valve;

(b) a hydraulic transfer cylinder assembly including a housing and a cartridge; the housing having a first compartment, a second compartment fillable with hydraulic fluid, and a piston separating the first and second compartments; the second compartment including an output port in hydraulic communication with the actuator retract side; the cartridge having a main firing element capable of producing expanding gas to enter the cartridge first compartment and force the piston to translate, thus forcing hydraulic fluid out the output port and into the retract side of the spoiler actuator;

wherein upon opening of the overwing exit door, the servo valve is triggered to move to its bias position, the battery activates the cartridge, and hydraulic fluid from the hydraulic transfer cylinder assembly is forced into the actuator retract side where, depending on the position of the extension check valve, the assembly fluid is used alone to retract the spoilers or is used in conjunction with the system pressure to retract the spoilers.

21. The improvement according to claim 20, wherein the housing second compartment further includes a fill port adapted to connect to the hydraulic system return line, a check valve being located at the fill port for allowing entry of hydraulic fluid into the housing second compartment while prohibiting the reverse flow.

22. The improvement according to claim 20, wherein an isolation check valve is in communication with the transfer cylinder assembly to allow hydraulic fluid to exit the second compartment through the output port while prohibiting the reverse flow.

23. The improvement according to claim 20, wherein the transfer cylinder assembly cartridge further includes a ignition device, and a time delay component.

24. The improvement according to claim 23, wherein the time delay component causes a delay of an amount in the range of about 0.26 to about 0.36 seconds.

25. The improvement according to claim 20, wherein the housing and piston are cylindrically shaped, the piston being positioned entirely within the housing, the piston being arranged to prohibit contact of expanding gas with the second compartment during firing of the cartridge.

26. The improvement according to claim 25, wherein the cartridge is located at one end of the housing and an end cap is located at the other end of the housing, the piston being located therebetween.

27. The improvement according to claim 26, wherein the end cap is installed with shear rings, to react the load generated during translation of the piston in the housing upon activation of the assembly.

28. The improvement according to claim 26, wherein clamps, bolted to the end cap and assembled to locate between lugs in the transfer cylinder housing, maintain the installed location of the hydraulic ports in the end cap relative to the housing.

29. The improvement according to claim 20, wherein the transfer cylinder assembly provides hydraulic fluid at a pressure in an amount in the range of about 0 psi to about 1,400 psi.

30. The improvement according to claim 20, wherein the servo valve includes at least first and second positions, the servo valve being mechanically biased to the first position and electronically moved between positions.

31. The improvement according to claim 20, wherein the extension check valve is mechanically biased to the position in which hydraulic fluid is not permitted to flow from the actuator retract side to the servo valve.

32. The improvement according to claim 20, further comprising a relief valve interconnected between the component input line and the return line.

\* \* \* \* \*

UNITED STATES PATENT AND TRADEMARK OFFICE
CERTIFICATE OF CORRECTION

PATENT NO.     : 6,189,837 B1
DATED          : February 20, 2001
INVENTOR(S)    : F. Matthews It is certified that error appears in the above-identified patent and that said Letters Patent is hereby corrected as shown below:

<u>Title page,</u>
<u>Column 1,</u>
Item [56] Refs. Cited (U.S. Pats.), insert in appropriate numerical order the following:

| | | |
|---|---|---|
| -- 2,509,942 | 5/1950 | Sanford |
| 2,674,852 | 4/1954 | Olman |
| 2,912,902 | 11/1959 | Nessler |
| 3,031,845 | 5/1962 | Ludwig |
| 3,199,288 | 8/1965 | Nahas |
| 4,091,621 | 5/1978 | Patrichi |
| 5,303,631 | 4/1994 | Frehaut et al. |
| 5,582,010 | 12/1996 | Lell -- |

Signed and Sealed this

Twenty-third Day of October, 2001

Attest:

*Nicholas P. Godici*

NICHOLAS P. GODICI
*Attesting Officer*     *Acting Director of the United States Patent and Trademark Office*